United States Patent [19]
Febres et al.

[11] Patent Number: 5,935,447
[45] Date of Patent: *Aug. 10, 1999

[54] SYSTEM AND METHOD FOR THE RECOVERY OF OIL IN WATER EMULSION SPILLED IN WATER

[75] Inventors: German A. Febres; Mariano E. Gurfinkel; Geoffrey McGrath, all of Caracas, Venezuela

[73] Assignee: Intevep, S.A., Caracas, Venezuela

[*] Notice: This patent is subject to a terminal disclaimer.

[21] Appl. No.: 08/923,571

[22] Filed: Sep. 4, 1997

Related U.S. Application Data

[63] Continuation-in-part of application No. 08/802,706, Feb. 19, 1997.
[51] Int. Cl.⁶ .......................... B01D 17/035; B01D 17/04
[52] U.S. Cl. ...................... 210/703; 210/776; 210/221.2; 210/922; 210/923; 210/708; 210/242.3
[58] Field of Search .................................. 210/220, 221.1, 210/221.2, 242.2, 242.3, 252, 922, 923, 924, 925, 703, 704, 708, 776

[56] References Cited

U.S. PATENT DOCUMENTS

| | | |
|---|---|---|
| 2,047,989 | 7/1936 | Woelfin . |
| 2,730,190 | 1/1956 | Brown et al. . |
| 3,479,281 | 11/1969 | Kikindai et al. . |
| 3,884,803 | 5/1975 | Traylor . |
| 3,966,613 | 6/1976 | Kirk et al. . |
| 4,198,300 | 4/1980 | Williams .................................. 210/170 |
| 4,627,922 | 12/1986 | Viator et al. ............................. 210/704 |
| 4,752,399 | 6/1988 | Viator et al. ............................. 210/704 |
| 5,133,882 | 7/1992 | Stearns .................................... 210/776 |
| 5,207,920 | 5/1993 | Jones ....................................... 210/703 |
| 5,527,461 | 6/1996 | Hill ....................................... 210/242.2 |
| 5,580,463 | 12/1996 | Hubred .................................... 210/703 |

Primary Examiner—Robert J. Popovics
Attorney, Agent, or Firm—Bachman & LaPointe, P.C.

[57] ABSTRACT

A method for on line recovery of oil from an oil in water emulsion spilled in water includes the steps of: obtaining a stream of recovered material including an oil in water emulsion and water; inducing a gas into the stream and applying shear so as to provide a mixture wherein oil from the oil in water emulsion is adhered to bubbles of the gas; passing the mixture to a flotation compartment for allowing the oil adhered to the bubbles to rise to a surface of the mixture; and removing the oil from the surface of the mixture.

16 Claims, 2 Drawing Sheets

SYSTEM AND METHOD FOR THE RECOVERY OF OIL IN WATER EMULSION SPILLED IN WATER

CROSS REFERENCE TO RELATED APPLICATION

This application is a Continuation-in-Part of U.S. application Ser. No. 08/802,706, (now allowed) filed Feb. 19, 1997.

BACKGROUND OF THE INVENTION

The invention relates to a system and method for recovery and separation of an oil in water emulsion spilled in water.

It is widely recognized that spills of oil and fuel such as oil in water emulsions and the like pose a serious ecological or environmental threat which must be addressed. These problems are exacerbated with oil in water emulsions due to interaction between the emulsion and water which renders recovery more difficult. Methods have been proposed for recovering oil from spills and the like. However, the need remains for a system and method for oil recovery, especially recovery from a spill of an oil in water emulsion, which effectively recovers a large percentage of the spilled oil.

It is therefore the primary object of the present invention to provide a system and method for recovery of spilled oil which is effective in recovering oil in the form of an oil in water emulsion.

It is a further object of the present invention to provide a system and method for recovery wherein a large percentage of spilled oil is recovered.

It is a still further object of the present invention to provide a system and method for recovery which functions in an on line continuous manner to rapidly contain and address a potentially hazardous spill.

It is another object of the present invention to provide a system and method for recovery of a spilled oil in water emulsion which provides substantially separated oil and substantially oil free water.

Other objects and advantages of the present invention will appear hereinbelow

SUMMARY OF THE INVENTION

In accordance with the present invention, the foregoing objects and advantages are readily attained.

According to the invention, a method is provided for on line separation of oil from an oil in water emulsion spilled in water which comprises the steps of obtaining a stream of recovered material including an oil in water emulsion and water; introducing a gas into said stream and applying shear so as to provide a mixture wherein oil from said oil in water emulsion is adhered to bubbles of said gas; passing said mixture to flotation means for allowing said oil adhered to said bubbles to rise to a surface of said mixture; and removing said oil from said surface of said mixture.

A system is also provided according to the invention for on line recovery and separation of oil and an oil in water emulsion spilled in water which comprises means for obtaining a stream of recovered material including an oil in water emulsion and water; means for introducing a gas into said stream and for applying shear so as to provide a mixture wherein oil from said oil in water emulsion is adhered to bubbles of said gas; and means for allowing said oil adhered to said bubbles to rise to a surface of said mixture whereby said oil can be removed from said surface.

BRIEF DESCRIPTION OF THE DRAWING

A detailed description of preferred embodiments of the invention follows, with reference to the attached drawings wherein.

DETAILED DESCRIPTION

The invention relates to a system and method for on line separation of oil from an oil in water emulsion spilled in water.

As set forth above, the recovery of oil, especially in the form of an oil in water emulsion spilled in bodies of water poses an ecological or environmental threat which must be addressed. The present invention provides a system and method whereby spilled oil, especially a spilled oil in water emulsion such as Orimulsion ™, a product provided by BITOR, S. A., can be rapidly recovered from the water in which it is spilled, and further wherein the oil phase is readily separated therefrom.

Although a wide variety of oil or oil in water emulsions could suitably be recovered in accordance with the system and method of the present invention, the present disclosure will be made in terms of recovery of Orimulsion ™, which is an emulsion of viscous bitumen in water, typically having a ratio of bitumen to water of approximately 70:30.

Figure 1:
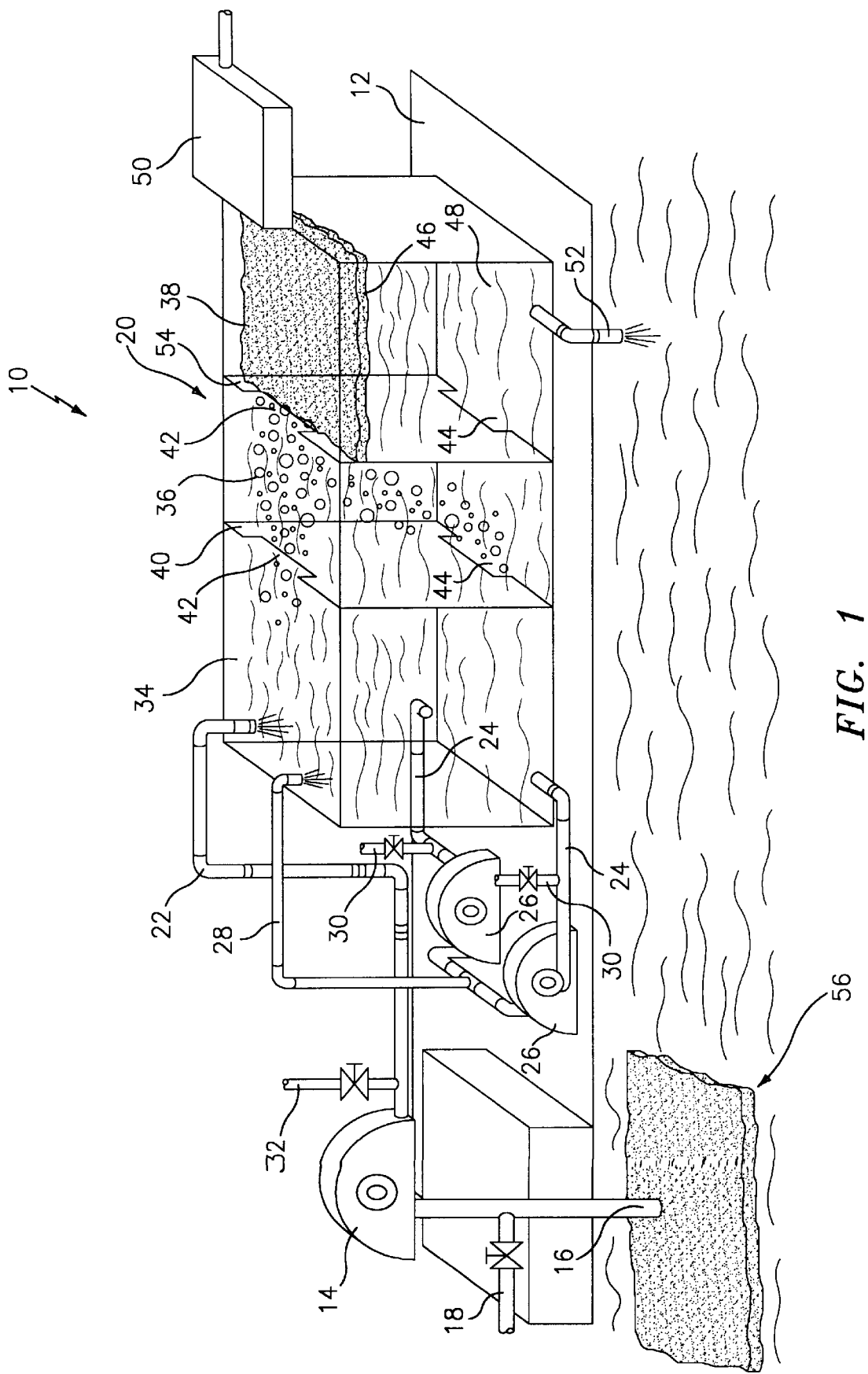
FIG. 1 is a schematic illustration of a first system in accordance with the present invention.

Referring to FIG. 1 of the attached drawings, a system 10 in accordance with the present invention is illustrated. According to the invention, system 10 preferably includes a base 12 or other platform which can suitably be positioned at the site of a spill, for example as a floating device or attachment to a water-going vessel and the like. According to the invention, system 10 preferably includes a primary pump 14 having a liquid inlet 16 for obtaining the mixture of oil in water emulsion and environmental water from which the oil in water emulsion is to be recovered. As shown, system 10 is preferably positioned with liquid inlet 16 positioned to draw in a stream of recovered material including the oil in water emulsion and, inevitably, a portion of water which will be referred to herein as environmental water.

In accordance with the invention, the stream of recovered material is subjected to the introduction of air and shearing conditions so as to disperse bubbles of air or other suitable gas throughout the mixture, thereby encouraging the adhesion of oil in the oil in water emulsion and environmental water mixture to the air bubbles so formed. According to the invention, and advantageously, oil is then readily separated from the water mixture constituting environmental water and water separated from the oil in water emulsion in a relatively short flotation step wherein oil adhered to air bubbles floats to the surface of the recovered product and is readily removed or skimmed therefrom.

Referring back to FIG. 1, an air inlet 18 is preferably provided and communicated with liquid inlet 16 so that a quantity of air as desired can be introduced into the stream of liquid recovered through liquid inlet 16. The air mixture drawn in from liquid inlet 16 and inlet 18 is then introduced to primary pump 14 wherein shear is applied so as to form the desired air bubbles dispersed throughout the mixture, and encourage adhesion of oil to the air bubbles as desired. From primary pump 14, the air stream is preferably fed to a multi-compartment tank 20 wherein bubble flotation and skimming so as to recover the oil phase are accomplished. This mixture may suitably be fed to tank 20 through line 22 as shown.

System 10 in accordance with a preferred embodiment of the present invention preferably also includes a recycling structure including outlet pipes 24, additional pumps 26, and return pipe 28 which are provided for drawing liquid from tank 20 and subjecting same to additional shearing in pumps 26. Furthermore, additional air inlets 30 are preferably provided so that additional air can be introduced to the liquid mixture upstream of additional pumps 26 as desired. In accordance with the invention, air is preferably introduced and shear is preferably applied so as to obtain an adhesion of oil to air bubbles of at least about 80% of the oil entering inlet 16, more preferably at least about 90%, and ideally at least about 98%.

In accordance with the preferred embodiment as illustrated in FIG. 1, air and shear may preferably be applied at primary pump 14 so as to provide adhesion to bubbles of at least about 80% of the oil entering inlet 16, and additional air and shear can be applied through additional pumps 26 and air inlets 30 so as to increase the adhesion of oil to air bubbles to at least about 98%. A further additional air inlet 32 may be positioned downstream of primary pump 14 if desired for introduction of still further air if needed.

System 10 also includes tank 20 as described above preferably having three compartments, specifically a receiving compartment 34, a flotation compartment 36 and a separation compartment 38. Receiving compartment 34 receives a stream of recovered material from line 22 and also from return pipe 28 which is preferably provided at sufficient velocity as to assist in the application of shear and subsequent adhesion of oil to air bubbles. From receiving compartment 34, air liquid is passed to flotation compartment 36 wherein a relatively short residence time provides for significant flotation of oil adhered to air bubbles toward the surface of liquid resident in flotation compartment 36. In order to dampen or eliminate turbulence which could be caused by introduction of liquid to receiving compartment 34, flotation compartment 36 preferably is communicated with receiving compartment 34 through a divider 40 having an upper cutout 42 and a lower cutout 44. Upper cutout 42 is preferably provided so as to allow flow from receiving compartment 34 to flotation compartment 36 in a surface flow zone, while lower cutout 44 is preferably provided so as allow flow from receiving compartment 34 to flotation compartment 36 in a bottom flow zone. In this way, excessive turbulence which could inhibit flotation of oil toward the surface is reduced.

As set forth above, a relatively short residence time in flotation compartment 36 results in significant separation of oil through flotation to the surface. In accordance with the invention, and for a typical Orimulsion ™ product, a residence time of about 1 minute to about 1½ minutes is sufficient to provide substantial separation; however, residence time is dependent on tank size and geometry.

From flotation compartment 36 the at least partially separated liquid including adhered oil and water are passed to separation compartment 38. In separation compartment 38, the remainder of oil, if any, which did not rise to the surface in flotation compartment 36 is allowed to complete the flotation so as to provide a top layer 46 containing oil recovered from the mixture.

Remaining water 48 in separation compartment 38 preferably has a residual oil content of less than or equal to about 20 parts per million, and is therefore suitable for return to the water environment of the spill.

As shown in FIG. 1, top layer 46 may suitably be removed using conventional skimming equipment 50, and an outlet pipe 52 may suitably be provided, preferably communicating with a lower portion of separation compartment 38, for discharging or returning water to the environment. As with compartments 34, 36, separation compartment 38 is preferably communicated with flotation compartment 36 by a divider 54 also preferably including upper and lower cutouts 42, 44. In this way, the flotation of oil toward top layer 46 is not inhibited by turbulence due to flow from flotation compartment 36 to separation compartment 38. Oil recovered through skimming equipment 50 may suitably be transferred to a further treatment station, or a storage tank or the like.

Still referring to FIG. 1, the method of the present invention will now be further described. In accordance with the invention, system 10 is preferably transported to the site of a spill, and is positioned with liquid inlet 16 communicating with a spill area schematically illustrated at 56. A mixture of spilled oil in water emulsion and environmental water is drawn in through liquid inlet 16 by primary pump 14, while air is introduced into air inlet 18. This mixture is subjected to shear when drawn through primary pump 14, and additional air may be introduced through air inlet 32, such that the air mixture is dispersed into receiving compartment 34 through line 22, preferably with a velocity sufficient to further enhance the shear to which the air and liquid mixture is subjected.

Liquid is also preferably drawn from receiving compartment 34 through outlet pipes 24 and, with additional air introduced through air inlets 30, is passed to additional pumps 26 for application of additional shear, preferably so as to provide an adhesion of oil to air bubbles of at least about 80% by volume of oil at inlet 16, preferably at least about 90% and ideally at least about 98%. This recycled portion of liquid from receiving compartment 34 is returned to receiving compartment 34 through return pipe 28.

The air liquid mixture of receiving compartment 34 passes through upper and lower cutout 42, 44 to flotation compartment 36, where oil adhered to air bubbles is allowed to float toward the surface of liquid in flotation compartment 36. The space velocity of liquid and air through system 10 may preferably be set so as to provide a suitable residence time in flotation compartment 36, typically between about 1 to about 1½ minutes as set forth above, although this time will vary depending upon the characteristics of the oil or bitumen and water.

In flotation compartment 36, oil adhered to air bubbles at least partially separates to the surface. During this time, the at least partially separated liquid mixture flows from flotation compartment 36 to separation compartment 38 through upper and lower cutouts 42, 44 of divider 54, so as to provide liquid in separation compartment 38 including top layer 46 of separated oil and the remainder of the compartment having treated water including less than or equal to about 20 parts per million of oil. Conventional skimming equipment 50 is preferably used to skim off top layer 46 of oil for further treatment or storage as desired, while outlet pipe 52 can be used to return the substantially cleansed water to the environment, preferably at a point sufficiently spaced from spill area 56 as shown in the drawing.

In accordance with the system described in FIG. 1, it has been found that air is preferably introduced to the stream of obtained oil in water emulsion and water in an amount of between about 6% to about 10% by volume of the incoming stream. This rate of air introduction has been found to readily provide the desired high percentage of adhesion of oil to air bubbles.

Figure 2:
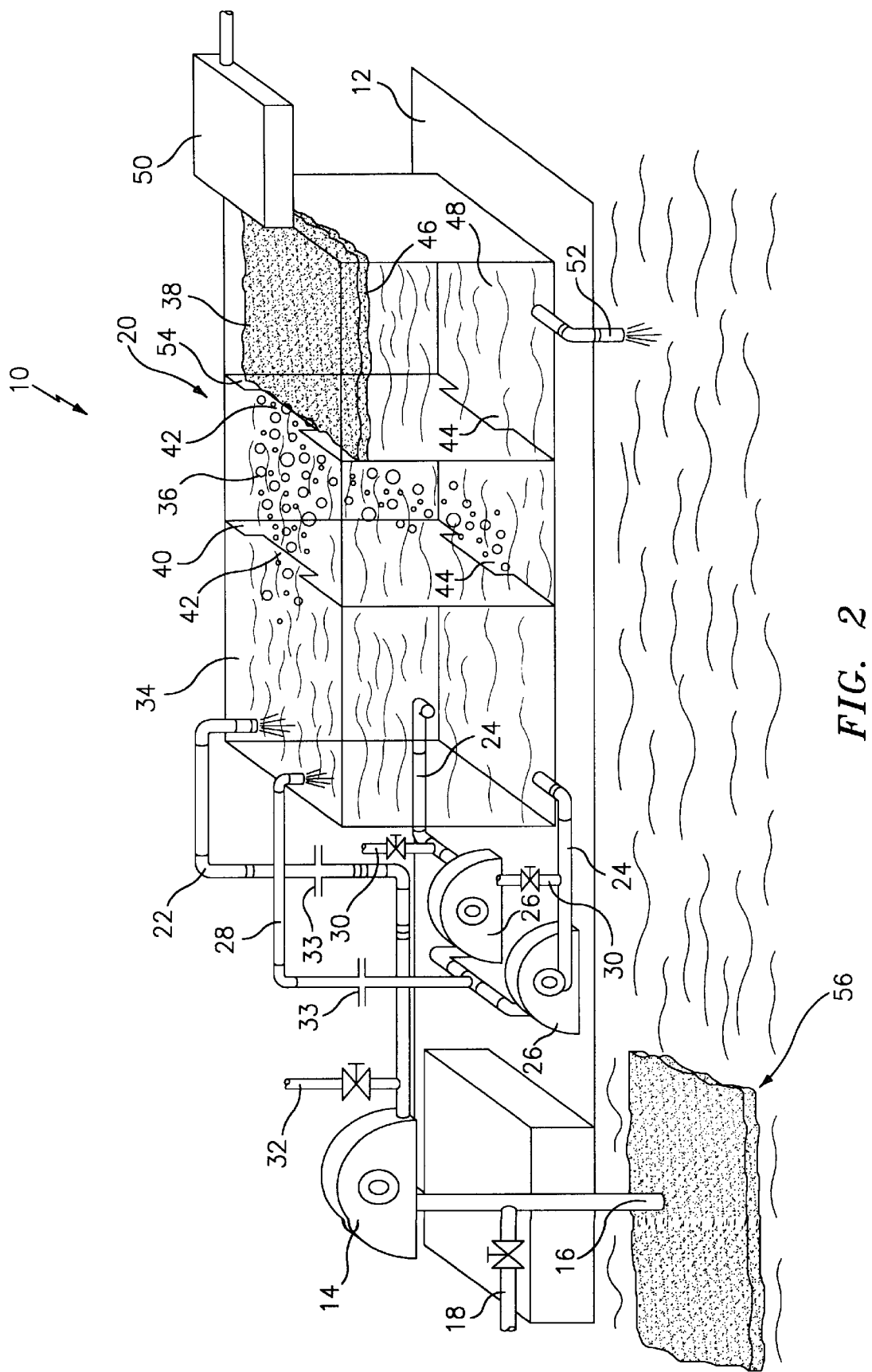
FIG. 2 is a schematic illustration of a second system in accordance with the present invention.

With reference to FIG. 2, a second embodiment of the invention will be described. In FIG. 2, the same reference numerals refer to the same components as in FIG. 1 described above.

It has been found that the efficiency of the process described above is dependent on the quantity of air which can be introduced into the stream of recovered material. In accordance with the second embodiment of the invention as shown in FIG. 2, it has been found that if a jet pump 33 is employed downstream of the primary pump 14, volumes of air as high as 50% with respect to the total mixture can be achieved. As shown in FIG. 2 a jet pump is provided in line 22 and, optionally, line 28. The jet pump is a conventional pump, known otherwise as an injection or induction pump, it induces the flow of air in proportion to the velocity of the liquid stream in the pump nozzle. As noted above, air volume fractions up to typically 50% have been achieved with standard jet pump designs. When employing a jet pump downstream of primary pump 14, air inlets 18 and 32 can be made optional as the volume of air necessary to carry out the process of the present invention is induced by the jet pump itself as noted above. The flow of liquid leaving the jet pump nozzle expands like a jet drawing air into the flow by a drag force. Once this jet expands sufficiently to impact the pipeline walls downstream of the nozzle 33 intense mixing takes place sufficient to produce a fine dispersion of air bubbles in the water. The mixing continues in the tubing from the jet pump to the floatation tank due to the turbulence in the flow such that collisions between oil droplets and bubbles are frequent causing adhesion of the two phases.

It has been found that by employing a jet pump downstream of the primary pump 14 a higher quantity of air can be introduced into the liquid stream than can be achieved by using conventional pumps such as centrifugal pumps.

The remaining parts of system 10, specifically the tank and the separation described with reference thereto with regard to FIG. 1, are identical in the system shown in FIG. 2 employing a jet pump.

It should be appreciated that although the present disclosure is provided in terms of introduction of air, other suitable gases may be used within the scope of the present invention, if desired, and depending upon interaction of such gas with the oil and water being treated.

It should also be appreciated that system 10 as described above advantageously operates in an on line manner wherein a stream of spilled emulsion and water are continuously introduced to primary pump 14 while a steady stream of cleansed water is returned to the environment, and skimmed oil from top layer 46 is transported to suitable containment or storage facilities.

It should also readily be appreciated that the system and method of the present invention provide for the rapid and effective recovery of at least the oil phase of a spilled oil in water emulsion, thereby reducing the environmental cost of such spills and recovering the potentially valuable resources which have been spilled.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A method for on line recovery of oil from an oil in water emulsion spilled in water, comprising the steps of:

obtaining a stream of recovered material including an oil in water emulsion and water;

inducing a gas into said stream by means of a jet pump and applying shear so as to provide a mixture wherein oil from said oil in water emulsion is adhered to bubbles of said gas;

passing said mixture to flotation means for allowing said oil adhered to said bubbles to rise to a surface of said mixture; and removing said oil from said surface of said mixture.

2. A method according to claim 1, wherein said inducing step comprises inducing said stream with said gas in an amount of up to 50% by volume of said stream.

3. A method according to claim 1, wherein said inducing step comprises inducing said gas and applying said shear so as to adhere at least about 80% by volume of said oil in said stream to said bubbles of gas.

4. A method according to claim 1, wherein said obtaining step is carried out using a primary pump means upstream of said jet pump.

5. A method according to claim 1, wherein said step of passing said mixture comprises passing said mixture to a receiving compartment, passing said mixture from said receiving compartment to a flotation compartment wherein said oil adhered to said bubbles rises to said surface so as to provide an at least partially separated mixture of said oil adhered to said air bubbles and said water, and passing said at least partially separated mixture to a skimming compartment wherein said oil forms a layer on top of said water;

skimming said layer of oil; and returning water from below said layer to a surrounding environment.

6. A method according to claim 5, further comprising the step of dividing at least two compartments of said receiving compartment, said flotation compartment and said skimming compartment with a divider wall defining a surface flow zone for communication between said at least two compartments and defining a bottom flow zone for communication between said at least two compartments whereby turbulence of flow between said at least two compartments is inhibited.

7. A method according to claim 5, further comprising the step of recirculating said mixture from said receiving compartment to a second jet pump means for inducing additional gas.

8. A method according to claim 1, wherein said gas is air.

9. A system for on line recovery of oil from an oil in water emulsion spilled in water, comprising:

means for obtaining a stream of recovered material including an oil in water emulsion and water;

jet pump means for inducing a gas into said stream and for applying shear so as to provide a mixture wherein oil from said oil in water emulsion is adhered to bubbles of said gas; and means for allowing said oil adhered to said bubbles to rise to a surface of said mixture whereby said oil can be removed from said surface.

10. A system according to claim 9, wherein said means for obtaining comprises pump means upstream of said jet pump means.

11. A system according to claim 9, wherein said means for allowing flotation comprises a receiving compartment for receiving said stream, a flotation compartment communicated with said receiving compartment for allowing said oil adhered to said bubbles to rise to a surface of said stream, and a separation compartment communicated with said flotation compartment for receiving said stream having a top layer of oil.

12. A system according to claim 11, further comprising additional pump means for shearing said stream, and means for recirculating said stream from said receiving compartment to said additional pump means and back to said receiving compartment.

13. A system according to claim 12, further comprising means for inducing additional air to said stream upstream of said additional pump means.

14. A system according to claim 11, further comprising skimming means for skimming said top layer of oil from said separation compartment and outlet means for discharging water from said separation compartment to said site.

15. A system according to claim 11, further comprising dividing means positioned between at least two compartments of said receiving compartment, said flotation compartment and said separation compartment and having means defining a surface flow zone for communication between said at least two compartments and means defining a bottom flow zone for communication between said at least two compartments whereby turbulence of flow between said at least two compartments is inhibited.

16. A system according to claim 15, wherein said means defining said surface flow zone comprises a cutout along a top edge of said dividing means, and wherein said means defining said bottom flow zone comprises a cutout along a bottom edge of said dividing means.

* * * * *